May 19, 1936.   J. M. FLOYD ET AL   2,041,461
WELDING MACHINE
Filed April 15, 1933   6 Sheets-Sheet 3

INVENTORS.
John M. Floyd
Leland E. Long
John W. Nash
Harry H. Dibble
BY
ATTORNEY.

May 19, 1936.  J. M. FLOYD ET AL  2,041,461
WELDING MACHINE
Filed April 15, 1933  6 Sheets-Sheet 4

INVENTORS.
John M. Floyd
Leland E. Long
John W. Nash
Harry H. Dibble
BY
ATTORNEY.

May 19, 1936.  J. M. FLOYD ET AL  2,041,461
WELDING MACHINE
Filed April 15, 1933  6 Sheets-Sheet 5

INVENTORS.
John M. Floyd
Leland E Long
John W. Nash
Harry H. Dibble
BY
ATTORNEY.

May 19, 1936. J. M. FLOYD ET AL 2,041,461
WELDING MACHINE
Filed April 15, 1933    6 Sheets-Sheet 6

INVENTORS.
John M. Floyd
Leland E. Long
John W. Nash
Harry H. Dibble
BY   J. D. Keiper
ATTORNEY.

Patented May 19, 1936

2,041,461

UNITED STATES PATENT OFFICE 2,041,461

WELDING MACHINE

John M. Floyd, Leland E. Long, John W. Nash, and Harry H. Dibble, South Bend, Ind., assignors to Bendix Aviation Corporation, South Bend, Ind., a corporation of Delaware Application April 15, 1933, Serial No. 666,230

18 Claims. (Cl. 219—4)

This invention relates to welding machines.

The invention comprehends a machine for manufacturing brake shoes and more particularly a machine for securing a rim to a web of a brake shoe.

An object of the invention is to provide a machine for spot-welding a rim to a web of a brake shoe which will perform the operation without distortion of the work during the welding.

Another object of the invention is to provide a machine for spot-welding one element to another having an automatic feed and automatically controlled means for accurately allocating the spot-welds.

Another object of the invention is to provide a machine including a rotatable support for the web of a brake shoe and means for automatically feeding a rim of a brake shoe to the support so that the web and the rim may move concomitantly beneath a suitable means for spot-welding the rim to the web including automatic means for controlling the welding operation.

A further object of the invention is to provide a machine having a rotary work support adapted to grip, and release an element automatically.

A still further object of the invention is to provide, in a welding machine adapted to make a series of welds, a means whereby the welding current may be varied from weld to weld in accordance with the resistance of the work being welded.

Still another object of the invention is to provide a machine adapted to form and weld simultaneously arcuate brake shoes from flat stamped material.

Other objects and features of the invention will appear from the following description taken in connection with the drawings which form a part of the specification, and in which:—

Figure 13 is a front elevation of a portion of the machine showing the work switch and welding transformer secondary shunt switch.

Figure 1:
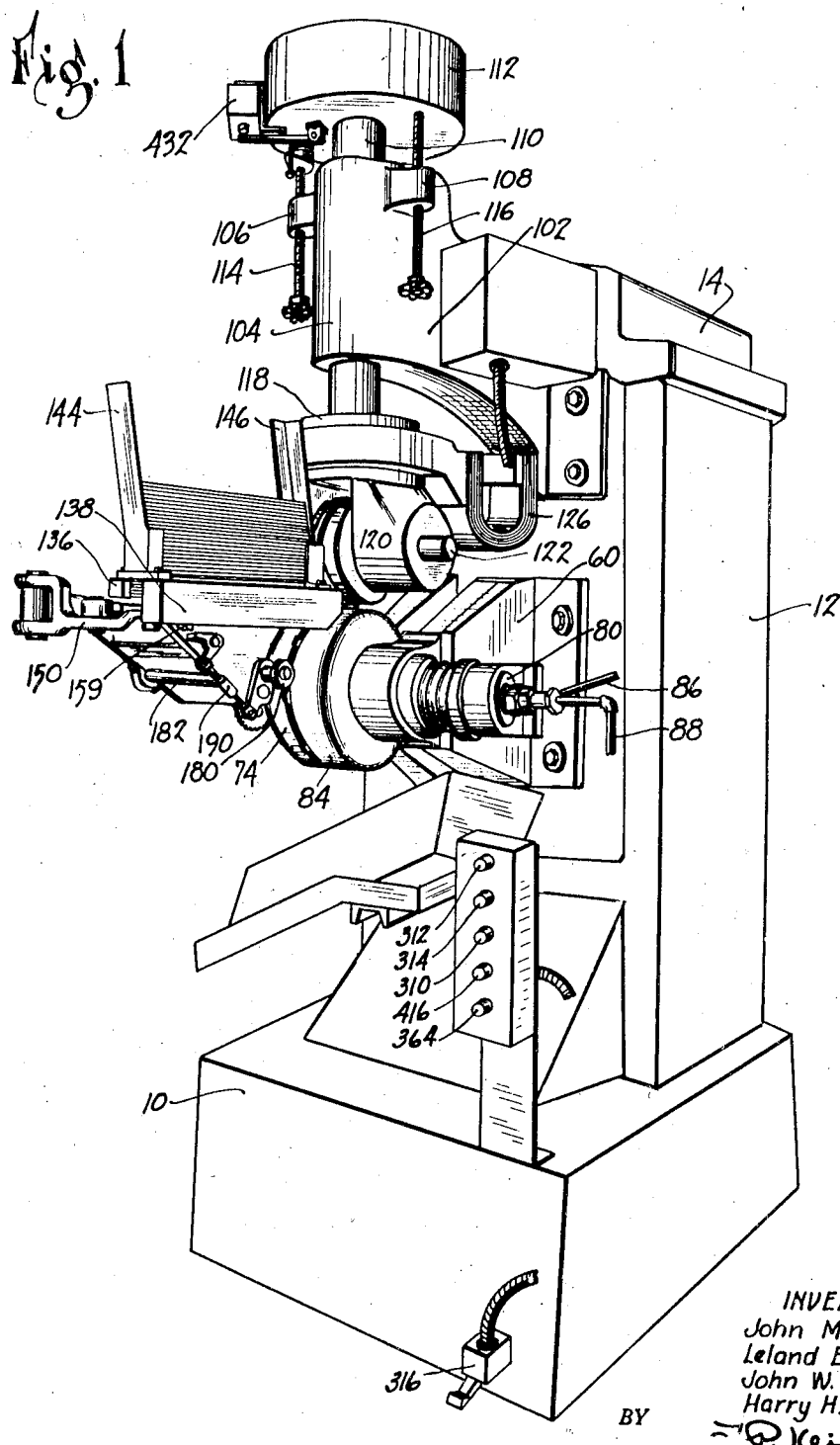
Figure 1 is a perspective view of a machine embodying the invention.
Figure 2:
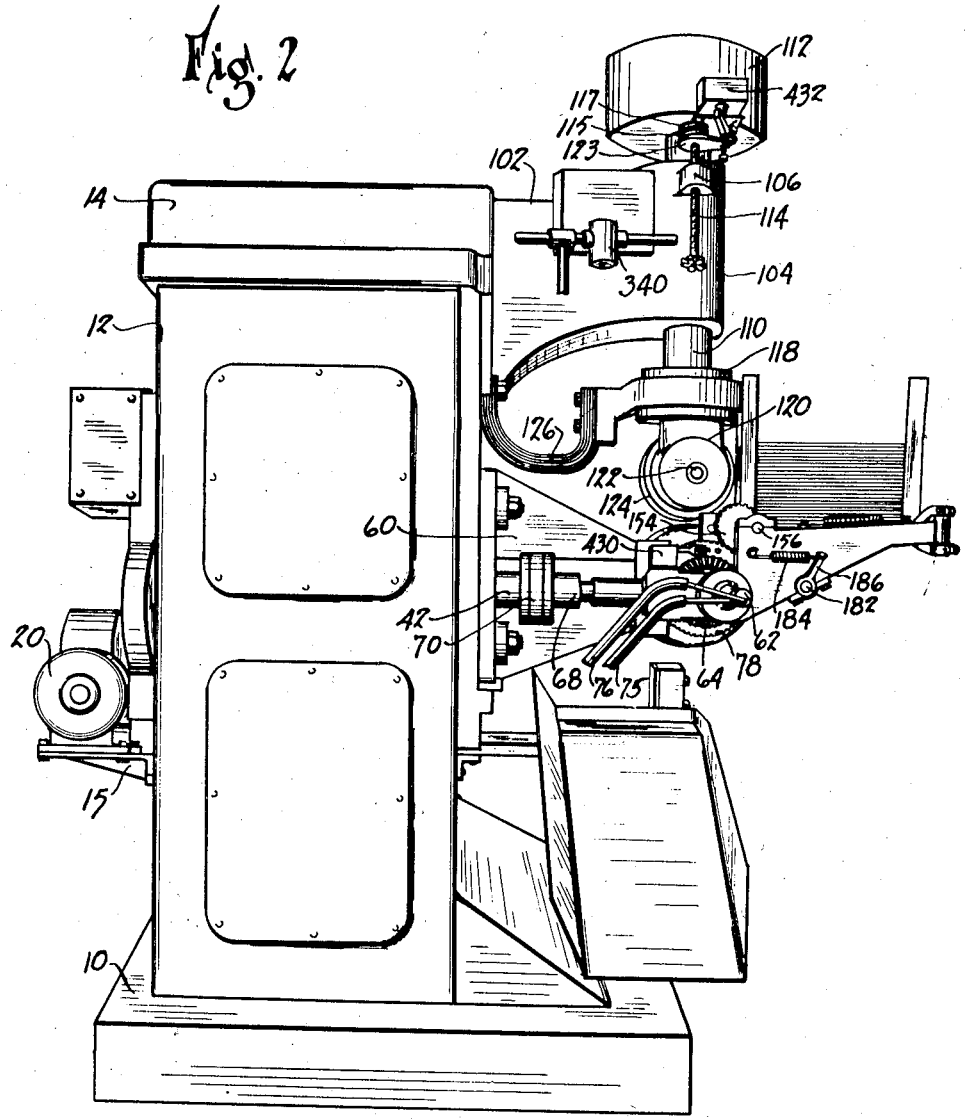
Figure 2 is a side elevation of the machine shown in Figure 1.

As shown in the drawings, and referring to Figures 1 and 2, the welding machine comprises a framework having a base 10, body portion or casing 12, adapted to house a welding transformer, and a head or top portion 14.

Figure 4:
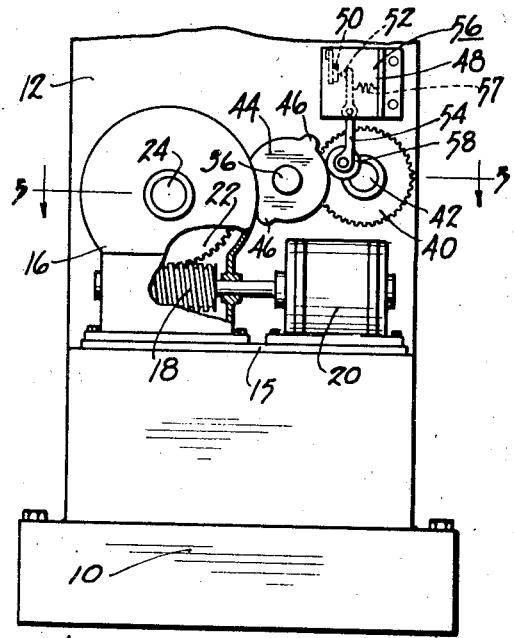
Figure 4 is a fragmentary view of the casing illustrating the driving means, the control switch and actuating means therefor.
Figure 5:
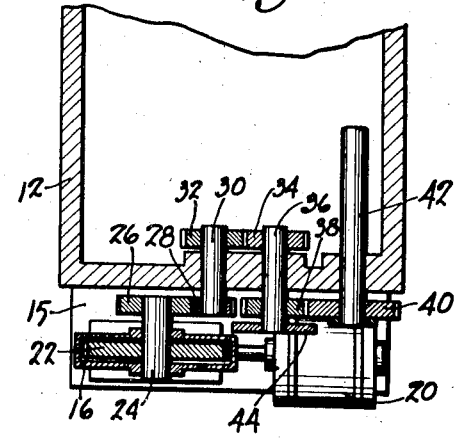
Figure 5 is a sectional view substantially on line 5—5, Figure 4.

Mounted on the rear of the casing 12, as best shown in Figures 2, 4 and 5 is a bracket 15 carrying a drive motor 20 which may be of the three phase type and a reduction gear comprising a housing 16 containing a worm 18, and worm gear 22, the latter driving a shaft 24. A series of gears or pinions 26, 28, 32 and 34 and 38 mounted upon shafts 24, 30 and 36 drive the gear 40 and shaft 42 which extends to the forward or front side of the welder. Also mounted on shaft 36 is a cam 44 having diametrically opposite spaced lobes 46 which engage a roller follower 58 mounted on a pivoted arm 54, extending into a switch 56 having a housing 48. A spring 57 therein is adapted to hold the roller 58 carried by the arm in engagement with the cam 44, and a pair of contacts 50 and 52, one of which is carried by the arm 54, are adapted to close a welding control circuit each time cam lobe 46 strikes the roller follower 58.

Figure 3:
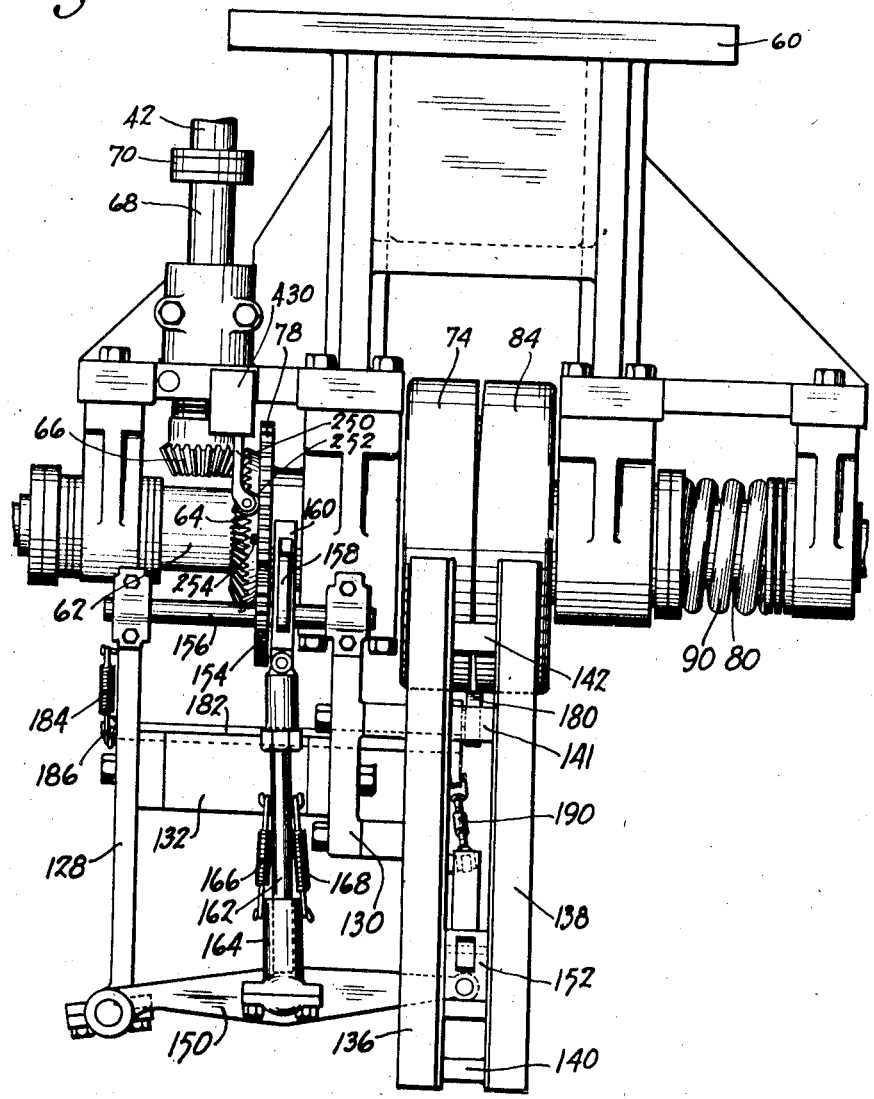
Figure 3 is a top plan view of the work support and feeding means.

Referring to Figures 1 and 2 and particularly Figure 3, on the front face of the casing 12 is provided a bracket 60 secured to the casing 12 but insulated therefrom which bracket carries two sets of journals adapted to support hollow shafts 62 and 80.

Figure 7:
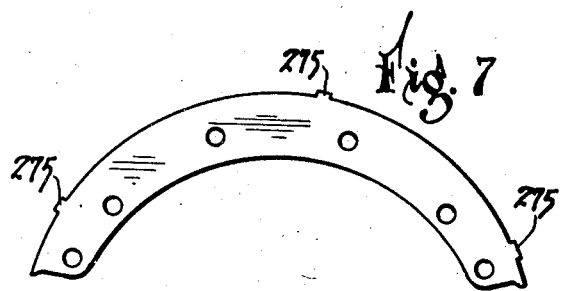
Figure 7 is a side elevation of a brake shoe web.
Figure 9:
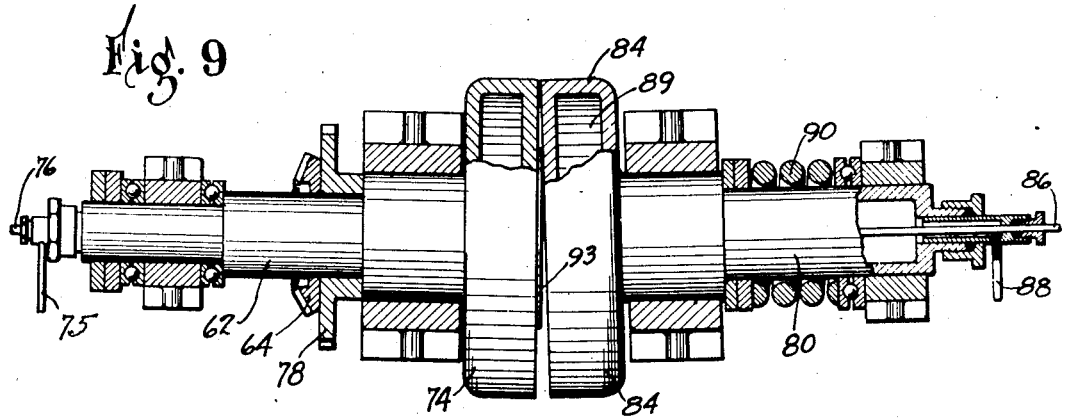
Figure 9 is an enlarged detailed view of the work support.
Figure 10:
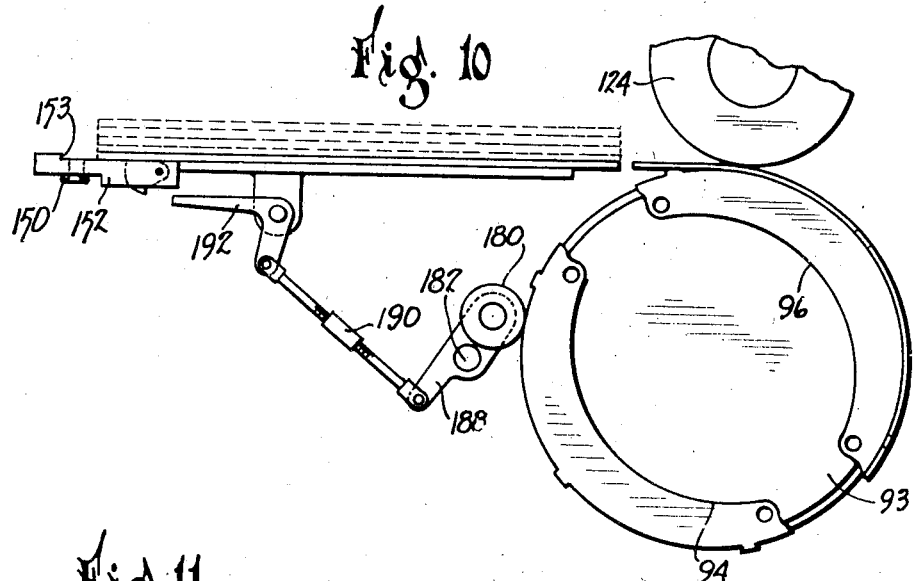
Figure 10 is a side elevation of the feeding mechanism.
Figure 11:
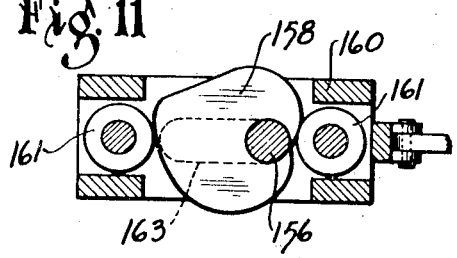
Figure 11 is a detail view of the feed cam.

To drive the shafts 62 and 80, the shaft 42, which extends from the rear of the casing 12 to the front thereof, carries an insulating coupling 70, thereby providing an insulated section 68 which in turn drives shaft 62 through bevel gears 66 and 64. As shown in Figures 3 and 9, the shafts 62 and 80 are provided with drum disc work supports 74 and 84 which are urged toward each other by the heavy spring 90 on the shaft 80. In order that the drum discs may hold a brake web such as is shown in Figure 7 securely, a plate 93 recessed about its periphery 96 to receive a pair of brake shoe webs, is placed between the drum discs and carried by one of them, and the axis of the shafts 62 and 80 are slightly disaligned approximately a half degree, so that a web may be manually and readily fed in between the drum discs from the under side, and when rotated to the top side will be securely held between the drum discs by compression of the spring 90. It will of course appear that the web will be released from the drum discs upon turning from the top toward the under side, and will drop out from its own weight.

Since during the welding operation considerable heat is developed, the hollow shafts 62 and 80 and the drum discs 74 and 84 are adapted for circulation of water therethrough as shown at 89, and fittings 75 and 76, and 86 and 88 are placed on the ends of shafts 62 and 80 for the purpose of bringing water to and carrying it away from the drum discs.

Figure 6:
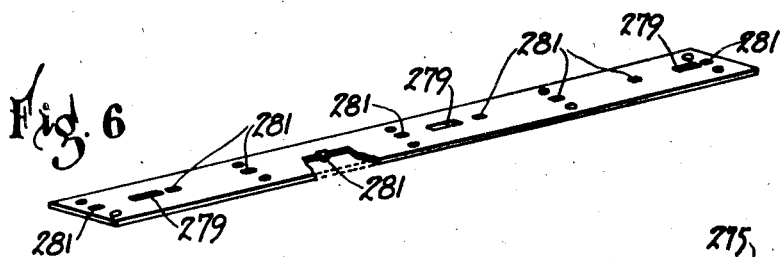
Figure 6 is a perspective view of a brake shoe rim before it is deformed.

The bracket 60 also carries a feeding mechanism for the flat strip rim material shown in Figure 6, which feeding mechanism is best illustrated in Figure 3. For this purpose a hopper base comprising a pair of spaced parallel members 136 and 138 which are tied together by cross members 140, 141 and 142 is carried upon a frame comprising members 128 and 130 which are secured to the journal blocks on the bracket 60 and brace member 132. The cross members 140, 141 and 142 are set down in between the parallel members 136 and 138 spacing said parallel members so as to permit the flat rims to rest on the cross members. A feeding mechanism comprising a sliding block 152 is adapted to reciprocate between the parallel members and feed one rim strip at a time.

To impart movement to the sliding block 152, a cross shaft 156, driven through gears 154 and 78 from the shaft 62 rotates at double the speed of shaft 62, and carries a suitably shaped cam 158. Cam 158 cooperates with follower rollers 161 which are carried in a housing 160 slotted as at 163 to reciprocate upon and be guided by the cross shaft 156. An adjustable link 162 seated in a socket 164 by reason of the tension of springs 166 and 168 actuates a lever 150 pivoted to the frame member 128 at one end and engaging the sliding block 152 at its other end. Through this mechanism the sliding block is caused to reciprocate once for each half revolution of the work holder or drum discs 74 and 84, and provision is made to guard against injury to the feed mechanism due to jamming since the springs 166 and 168 may yield under such circumstances.

In order to restrict the feeding of flat strip material to such times as a shoe web is being carried by the rotating drum discs 74 and 84, a roller 180 mounted eccentrically on a shaft 182 journalled in the frame members 128 and 130 is urged into contact with the drum discs 74 and 84 or a shoe web which may be held therebetween, by the tension of a spring 184 acting on a crank 186 located at the opposite end of the shaft 182. Since the web is supported between the drum discs in such a manner as to project beyond the periphery thereof, the roller is pushed away from the drum discs whenever a web is secured therebetween, and the roller through the lever arm 188 is adapted to actuate through a link 190, a trip lever 192.

Figure 14:
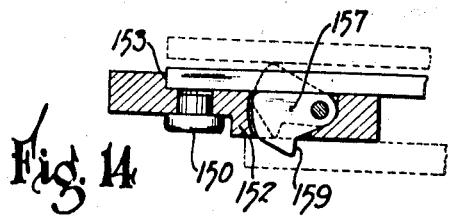
Figure 14 is a view partly in section of a reciprocating feed block and release mechanism.

The sliding feed block, as shown in Figure 14, carries thereon a trip cam 157 which when actuated as shown in dotted lines is adapted to lift the shoe rim material over the shoulder 153 thereby preventing the feeding of a rim piece.

The actuation of the cam 157 will take place whenever the trip lever is positioned so as to engage a notch 159 which is located on the under side of the cam, it being understood that the link 190 is adjusted so that at such times as there is no shoe web to engage the roller 180, the trip lever will engage the cam notch. The roller also functions to position and hold the shoe web in place just prior to the gripping action of the drum discs, which are adapted to securely clamp the work while it is being carried on the upper side of the drum discs.

The head 14 of the welder carries an arbor 102 extending out over the work support, and carries therein a vertical axially shiftable column 110 which is fitted at its lower end with a pair of spaced journals 120 between which is located a welding roller 124 on a shaft 122. The upper end of the column carries thereon a weight 112 and the downward movement of the welding roller 124 is limited by the engagement of the weight with the vertical adjustment screws 114 and 116 mounted on either side of the arbor in the ears 106 and 108. Electrical connection to the movable roller is made through the flexible connector 126 which is connected to the journals 120 and column 110, all of which may be grounded in practice.

As shown in Figures 1, 2 and 13, the adjusting screw 114 carries on its end, but insulated therefrom, flat contact plate 115 which is adapted to engage a complementary plate 117 secured to the weighted column. These contacts are connected directly across the welding roller 124 and the work support drum discs 74 and 84 so that at such times as the weighted column is lowered as when there is no web or rim between the rollers, the secondary of the welding transformer is short circuited thereby preventing any possibility of burning the rollers or end portions of the shoes as they pass beyond the contact point between the roller and drum discs, the reason for which will appear hereinafter. This also makes it unnecessary for the roller 124 to directly contact with the drum discs 74 and 84 causing wear which might otherwise be necessary, as will also appear hereinafter.

As best shown in Figure 13, a work switch 432 is provided which is mounted upon the weighted column 110. An arm 123 mounted on the adjusting screw 114 adjacent the lower contact plate 115 is adapted to actuate a lever 125 pivoted on the weighted column, at one end, and actuating the switch 432 at its other end. This switch is so arranged as to cut off the welding current at such times as the column is not lifted off the screws 114 and 116 for example when there is no material passing between the roller 124 and drum discs 74 and 84.

Figure 8:
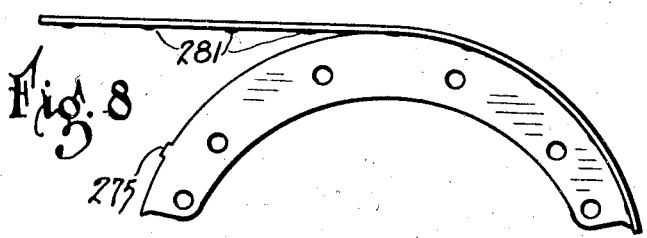
Figure 8 is a side elevation of a brake shoe web illustrating a rim partly attached.

Referring to Figures 6, 7 and 8, there will be seen a flat strip adapted to be formed into a shoe rim and an arcuate web member which is adapted to be secured to the rim member. The web member is provided with projections 275 which are adapted to project into the slots 279 provided in the rim member. A plurality of depressions 281 are provided equally spaced along the center line of the rim member, which depressions are adapted to form weld points during the welding of the rim and web members. Since at the time of making the first weld all of the current must necessarily pass through the weld point, the rim and web being separated at all other points, too much heat would be developed and therefore to reduce the current at this time a first weld switch 430 is mounted upon the frame 60. An arm 250 carrying a roller 252, extends from the switch in such a manner as to engage diametrically opposite projections or cams 254 mounted on the face of the gear 78.

Figure 12:
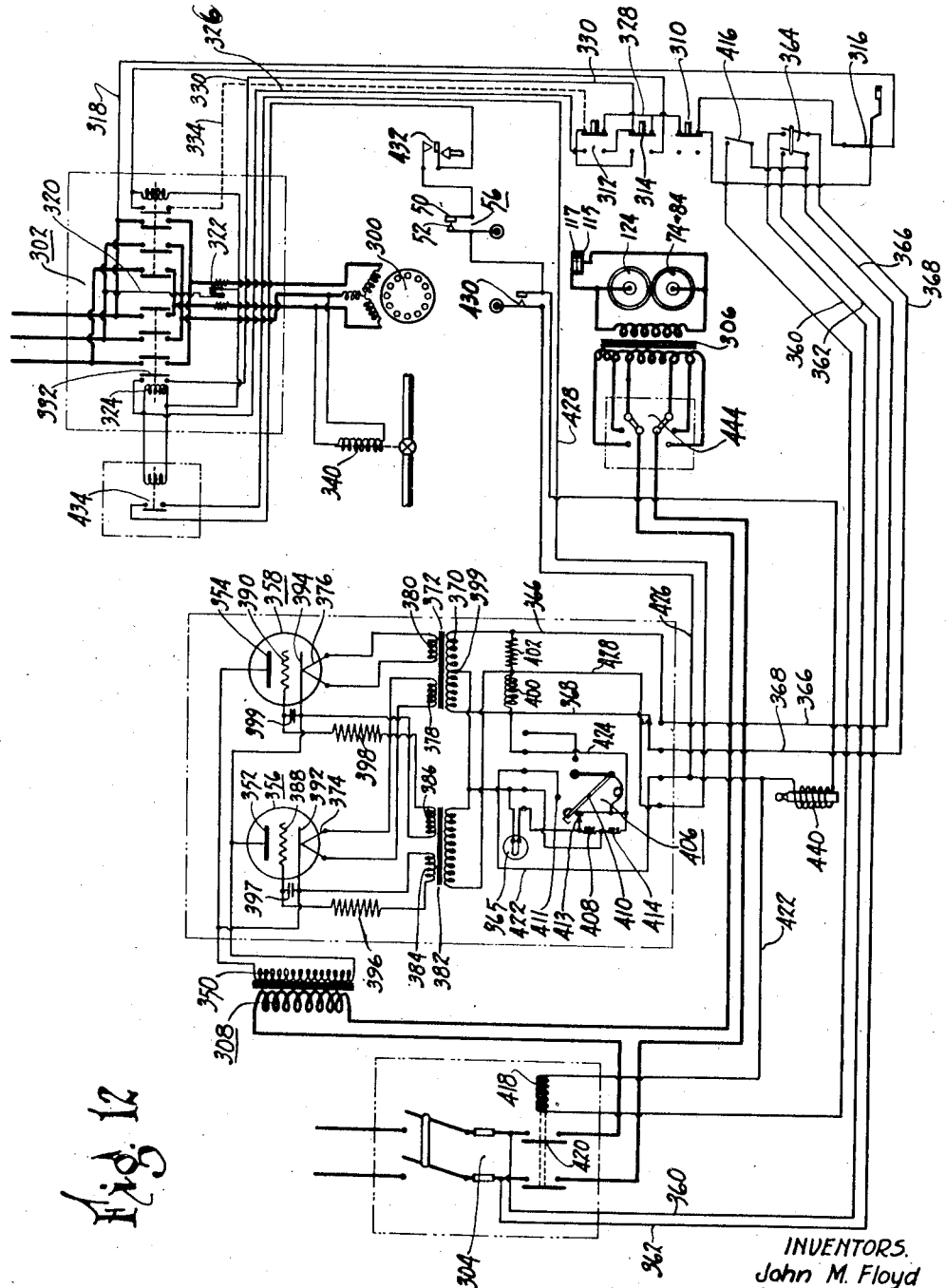
Figure 12 is a diagrammatical illustration of the circuit for operating the machine.

The electrical circuit, as illustrated in Figure 12, comprises a three phase motor drive circuit, a welding circuit and a control circuit. As shown, a suitable three phase motor is connected through a magnetic reversing switch 302 to the line. The welding circuit is connected to a single phase alternating current line through a main cut-out switch 304 and consists primarily of a welding transformer 306 and a control impedance transformer 308.

Control of the drive motor is accomplished through a circuit having a stop switch 310, a forward switch 312 and a reverse switch 314 together with an emergency or foot stop switch 316. Current in general for the control circuit is taken from the three phase line through leads 318 and 320, the latter of which passes through an overload relay 322 adapted to break the control circuit upon any abnormal loading of the motor circuit.

It will readily appear that a depression of the forward switch 312 will cause current to flow from the overload relay 322 to the forward control magnet 324, and thence through lead 326 through the forward switch contacts through lead 328, stop switches 310 and 316 and back through lead 318, thereby energizing magnet 324 and closing the reversing switch to forward position. Upon release of the forward switch 312 to its position as shown, the circuit will continue to be completed through the magnet 324 by reason of contacts 332 being closed and the lead 330 and the reverse control switch 314. The reversing circuit is similar in all respects except that the lead 334 is preferably omitted, thereby making it necessary to hold the reverse switch 314 depressed so long as reverse drive is desired. It will readily appear that opening the control circuit at any point, such as will deenergize magnet 324 of the reversing switch 302, will result in the opening of the three phase motor circuit. A solenoid operated valve 340 is adapted to turn on the flow of water to the drum discs 74 and 84 at such times as the motor circuit is closed by reason of its connection to the motor circuit.

To obviate the necessity of mechanically closing and opening a high amperage or high voltage welding circuit, it has been found desirable to control the welding circuit and current by means of a pair of thyratrons, connected across a high voltage secondary of a transformer whose primary is connected in series with the welding transformer. By varying the grid potential of the thyratrons, relative to the plate potential, or by varying the phase relation between grid and plate potentials, a short circuit in effect may be imposed on the secondary of the high voltage transformer through the thyratrons, thereby reducing the impedance of the transformer to an extremely low value, permitting a welding current to flow.

To accomplish this purpose the transformer 308 has a high voltage secondary 350 connected to the plates 352 and 354 of the thyratrons 356 and 358. The filament lighting circuit and grid charging circuit is fed by leads 360 and 362, filament control switch 364 and leads 366 and 368 which are connected to the primary 370 of the filament transformer 372. As shown the filaments 374 and 376 are heated by the secondary winding 378 and 380 of the filament transformer.

A grid transformer 382 having secondaries 384 and 386 which are connected respectively to the cathodes 392 and 394 and the grids 388 and 390 through resistors 396 and 398, derives its primary current from a connection 399 to the midpoint of the primary of the filament transformer 372 and connections through an inductance 400 to one side of the filament transformer and through a resistor 402 to the other side of the transformer, for reasons hereinafter set forth.

In order to prevent the application of any plate potential to the thyratrons until after the filaments have had a sufficient time to heat, a time delay switch 406 is provided having a synchronous motor diagrammatically illustrated at 408 which motor must make a certain number of revolutions before switch arm 410 contacts with contact 411, but after which the synchronous motor is disconnected through the opening of contacts 413. A magnetic lock 414 holds the switch arm 410 in engagement with contact 411 so long as the circuit completed through switch 364 remains closed, and an indicator 365 is provided to indicate that the time delay relay motor is in operation.

After closing the filament switch 364, the contactor switch 416 may be closed thereby connecting the magnet 418 of contactor 420 in series through lead 422 with the time control switch 406 and upon the operation or closing of the contacts 411 and 410 thereof, the circuit is completed through lead 424 to the lead 368 and thence to the filament switch 364.

Returning to the inductance 400 through which the grid transformer 382 is connected to one lead 368 of the filament transformer, it will be seen that, through leads 424 contacts 410 and 411, lead 422, lead 426, and on the other hand leads 428, and a plurality of switches 56, 432 and 434, connected in series, the inductance 400 is adapted to be short circuited upon simultaneous closure of each of the switches 56, 432 and 434. Switch 56 is the timing switch actuated by the cam 44 and follower 58 of Figure 4. Switch 432 is the work switch best shown in Figure 13 and is adapted to be closed when the welding roller and drum discs are separated by reason of a shoe web and rim passing therebetween. Switch 434 is adapted to be closed whenever the magnet 324 is energized, thereby being closed only when the motor 300 is driving in a forward direction. With any one of these switches open, the grid transformer charges the grids opposite to the respective plate potentials, thereby substantially choking off the flow of plate current resulting in the primary of transformer 308 offering a high impedance. With all the switches 56, 432 and 434 closed, the inductance 400 is shunted, and the phase relation of the current flow in the grid transformer is shifted causing the grid to be charged to a certain extent the same as their respective plates, thus causing current to flow in the secondary 350 of transformer 308 and in effect short circuiting the same and reducing the impedance of the primary to a low value. Small condensers 397 and 399, interconnecting the grids and cathodes, aid in controlling the phase relation of the grid potential relative to the plate potential.

In order to limit the welding current to a suitable value while making the first weld, for reasons heretofore set forth, a variable inductance 440 is arranged in shunt with the first weld switch 430, so that while making the first weld, the switch 430 is held open, thereby short circuiting the inductance 400 through the variable inductance 440, resulting in a lesser phase displacement of the grid potential.

In practice the thyratrons due to their mercury vapor content may conduct a current of approximately 10 amperes, at a potential of several thousand volts, thereby permitting complete control of the welding current. As shown the welding transformer is tapped and provided with control switches 444, and the secondary of the welding transformer is adapted to be shunted by the contacts 115 and 117 at such time as no work is passing through the machine. This prevents the formation of accidental arcs which might injure the mechanism or end portions of various types of brake shoes, since even though the welding current is substantially interrupted by the high impedance of transformer 308, a residual current flows in the welding circuit at all times when magnetic switch 420 is closed.

In operation, webs are fed by hand or otherwise into the under side of the drum discs 74 and 84, and a flat rim is fed from the magazine. The two are so synchronized as to bring the projections 275 of the web into the slots 279 of the rim as the parts are fed together. As the material is fed into the machine, the roller 124 is forced to lift up thereupon closing the work switch 432 and opening the welding transformer secondary shunt switch 115 and 117. The cam 44 is timed to contact the switch 56 as each projection 281 on the rim passes between the rolls, thereby sending a welding current through the rim projection and web, and flowing the parts together instantaneously. During the first weld, cam or projection 254 opens the first weld switch 430, thereby reducing the amount of the current applied to the work during the first weld. As the web carries the rim through the machine, it is bent to proper shape around the periphery of the web, aided by the roller 124 and drum discs 74 and 84 which tend to keep the rim at right angles to the web during the deformation. While one web and rim are being welded, a second web may be inserted underneath the drum discs, which web in turn is carried around and fed into the rollers with a second rim, and as soon as the first web and rim leave the roller 124 the grip of the drum discs due to the spring 90 is relieved and the finished shoe drops out from the under side, permitting the insertion of a third web.

Though only one embodiment or modification of the invention has been illustrated and described, it is to be understood that the invention is not limited thereto but may be embodied in various mechanical and electrical forms. For example work holders may be varied to hold various types of elements to be welded and the location of switches, and operating mechanism may be varied to suit requirements as desired. As such changes in construction and arrangement of parts may be made without departing from the spirit of the invention, as will be apparent to those skilled in the art, reference will be had to the appended claims for a definition of the limits of the invention.

We claim:

1. The steps in the method of making a brake shoe which comprises rotating an arcuate web member substantially about its arcuate center, feeding a flat flange member tangential to said web member, securing an end of said flange member to an end of said web member, and bending said flange member around the arc of said web member.

2. The steps in the method of making a brake shoe which comprises rotating an arcuate web member about its arcuate center, feeding a flat flange member tangential to said web member, securing an end of said flange member to an end of said web member by electrical welding, and bending said flange member around the arc of said web member.

3. The method of making a brake shoe which comprises rotating an arcuate web member about its arcuate center, feeding a flat flange member tangential to said web member, securing an end of said flange member to an end of said web member by electrical welding, bending said flange member around the arc of said web member, and welding the flange and web together at intervals.

4. The steps in the method of making a brake shoe which comprises rotating an arcuate web member about its arcuate center, feeding a flat flange member tangential to said web member, and bending said flange member around said web member.

5. The steps in method of making a brake shoe comprising, inserting an arcuate web member between the spaced peripheries of a pair of rotating disc faces having axes arranged slightly at an angle to each other and which are urged toward each other, rotating the web and disc faces to a point where the disc faces grip the web, securing a flange member to the forward end of the web, bending said flange member around the periphery of the web as it rotates, and further rotating the web and flange to a position where the grip of said disc faces upon said web is released.

6. The method of welding two members together electrically at a series of spots which comprises, bringing the members together at one spot, passing a suitable welding current therethrough, bringing the members together at subsequent spots, and passing a welding current of increased density through the members thereby effecting a substantially uniform weld at all spots.

7. An electric welding machine comprising an electrical circuit including a primary winding of a welding transformer, means for substantially interrupting the flow of electrical current periodically in said primary to effect a series of welds and means for increasing the intensity of the interrupted electrical current after the first weld.

8. An electric welding machine comprising an electrical circuit including a primary winding of a welding transformer, and a regulating transformer in series therewith, a pair of thyratrons having their respective plates and cathodes cross connected to the secondary terminals of said regulating transformer and means including connections to the grids of said thyratrons for intermittently regulating the flow of current from plate to cathode in said thyratrons, said means including means to vary the intensity of current flow from plate to cathode in accordance with the electrical conductance through the material to be welded.

9. An electric welding machine comprising an electrical circuit including a primary winding of a welding transformer, an inductance in series therewith, means for varying the impedance of said inductance from a high value to a low value, a secondary winding on said welding transformer and means for short circuiting said secondary winding operative only at such times as the impedance of said inductance is high.

10. A feed mechanism for flat stacked material comprising a slidable member having a shoulder adapted to engage a thickness of material, a cam in said member adapted to lift the material out of the path of said shoulder, and means to actuate said cam.

11. A revolving work holder comprising a pair of drums, and means for resiliently urging one drum against the other, one of said drums being mounted on an axis having a slight angle with respect to the axis of the other of said drums.

12. A revolving work holder comprising a pair of drums having axes slightly out of line with each other, and means resiliently urging said drums together.

13. A feed mechanism for stacked flat material comprising a reciprocating member adapted to engage a thickness of material and move the same relative to the stack, and means carried on said member for raising the material slightly and out of engagement with said member.

14. In a spot welding machine, electrical contact members for engaging parts to be welded, a welding transformer having a primary continuously connected to a source of power through an impedance, the value of which is varied to initiate and terminate the flow of welding current and secondary connected to said contact members, and means for limiting the approach of said contact members toward one another to the approximate thickness of the parts to be welded and for short circuiting said contact members for protection against burning when said parts to be welded are removed from the contact members.

15. In a welding machine for welding an arcuate member and a flat member together, a rotatable work holder adapted to hold and rotate said arcuate member about its arcuate center, means for feeding said flat member tangentially to said rotatable arcuate member, and means for effecting a weld between said arcuate member and said flat strip at the point of tangential contact between said members.

16. In a welding machine, a rotatable work support comprising convergently urged slightly disaligned discs, a shaped recess between said discs for receiving a work member of complementary shape, means for feeding a second work member in proper relation to said first rotating work member, means associated with said means for feeding for rendering said feeding means inoperative, said associated means being adapted to engage and be actuated by said rotating work member and be prevented by such engagement from rendering said feeding means inoperative, whereby the feeding of said second work member is dependent upon the presence of said first work member in said rotatable work support.

17. In a welding machine, work support means for rotating and holding an arcuate work member in a specific manner, feeding means for feeding a second work member, having periodically spaced welding projections, into engagement with said arcuate work member so that the welding projections contact said arcuate member, means including an electrical circuit control and contacts for the work members for applying a welding current to said work members at each of said spaced welding projections, and drive means common to said work support means, said feeding means and said applying means whereby the rotating and feeding of the work members is correlated and the circuit control is synchronized with the passage of each welding projection between the contactors for the work member.

18. A revolving work holder comprising a pair of drums, and means for resiliently urging one drum against the other, one of said drums being mounted on an axis having a slight angle with respect to the axis of the other of said drums and at least one of said drums being recessed in its adjacent end face to receive a work piece.

JOHN M. FLOYD.
LELAND E. LONG.
JOHN W. NASH.
HARRY H. DIBBLE.